April 21, 1959 M. GALLO 2,883,558

FUNCTION GENERATING APPARATUS

Filed Sept. 20, 1955 4 Sheets-Sheet 1

INVENTOR

MARIO GALLO,

BY Stone, Boyden & Mack,

ATTORNEYS

INVENTOR
MARIO GALLO,
BY Stone, Boyden & Mack,
ATTORNEYS

INVENTOR
MARIO GALLO,
BY Stone, Boyden & Mack,
ATTORNEYS

April 21, 1959 M. GALLO 2,883,558

FUNCTION GENERATING APPARATUS

Filed Sept. 20, 1955 4 Sheets-Sheet 4

INVENTOR
MARIO GALLO,

BY Stone, Boyden & Mack,

ATTORNEYS 2,883,558

FUNCTION GENERATING APPARATUS

Mario Gallo, Zurich, Switzerland, assignor to Contraves A.G., Zurich, Switzerland, a corporation of Switzerland Application September 20, 1955, Serial No. 535,346

6 Claims. (Cl. 250—219)

This application relates to a function generator and, more particularly, to an apparatus for generating an output quantity having a predetermined functional dependence upon a variable input quantity.

The present application is a continuation-in-part of Gallo application Serial Number 440,773, filed July 1, 1954. The prior application discloses a function generator including means for moving a tape-type exchangeable recording strip on which a function $y=f(x)$ is recorded, in accordance with a variable input quantity, along the length of the strip. The function on the strip is preferably recorded in polydromic representation to diminish the width of the strip.

The apparatus of the prior application further includes a rotatable polydromic curve follower, preferably a regular polygon prism of $2n$ sides, where $n$ is a whole number. The curve follower directs light projected through the recording strip onto a detector comprising a light transducer and an image screen diaphragm. The light transducer includes a differential photocell system and its associated amplifier and provides an electrical correcting voltage which is applied to a servo motor, the motor in turn being used to rotate the shaft carrying the curve follower. The position of the shaft corresponds to the output quantity, and the correcting voltage supplied by the detector maintains the output quantity in functional dependence on the input quantity as determined by the function $y=f(x)$ recorded on the recording strip.

The apparatus of the present invention is designed to accomplish substantially the same result as that of the earlier apparatus, and in a similar manner, but it includes several improvements thereover.

The polydromic representation used in the apparatus of the previous application includes a pair of curve segments parallel to each other and displaced by a distance $\bar{y}$, only one of the curve segments being located within the active recording section of the strip at any one location. The image screen diaphragm of the earlier application was designed, in effect by movement of the curve follower, to follow only the curve segment within the active recording section of the strip, and to switch from one curve segment to the other as said other curve segment entered, and said one curve segment left, the active recording section. However, in practical operation of this apparatus, it was found that the shift from one curve segment to the other was liable to cause an error in position of the curve follower by an angle corresponding to the relative curve segment displacement $\bar{y}$, since the curve follower might shift to the wrong set of the prism faces, yet still follow the curve segments. The apparatus of the present invention counteracts the possibility of error by providing an image screen diaphragm which follows, in effect, both of a pair of parallel adjacent curves, the projection of the center of the diaphragm on the strip being maintained midway between the curve segments. Thus, the possibility of shift to the wrong set of faces of the curve follower is diminished.

The improvements of the present application further include a new design of the configuration of the image screen diaphragm and a new type of light transducer, both provided to increase the accuracy of dependency of the output upon the variable input in accordance with the function desired.

The method and apparatus of the present invention will now be more fully described in accordance with the attached drawings showing a preferred embodiment of the invention.

The apparatus now to be more fully disclosed in this application constitutes an improvement on a method and apparatus disclosed in prior co-pending Gallo application Ser. No. 440,773, filed July 1, 1954. The general function of the apparatus of this application is substantially identical with that disclosed in the prior application, but this application discloses and claims some improvements on the apparatus disclosed in the earlier application. The improvements are directed to new features of the scanning means of the apparatus and to an improved relationship between the separation of the curve segments on the film storage device or recording strip and the dimensions of portions of the scanning means. Reference is made to the parent application for a complete disclosure of the use of apparatus of this type and of polydromic representation of a function, and the portions of the apparatus of the present application which were disclosed in the prior application will be described only in sufficient detail to make the operation of the entire apparatus of this invention understandable.

Figures 1, 2:
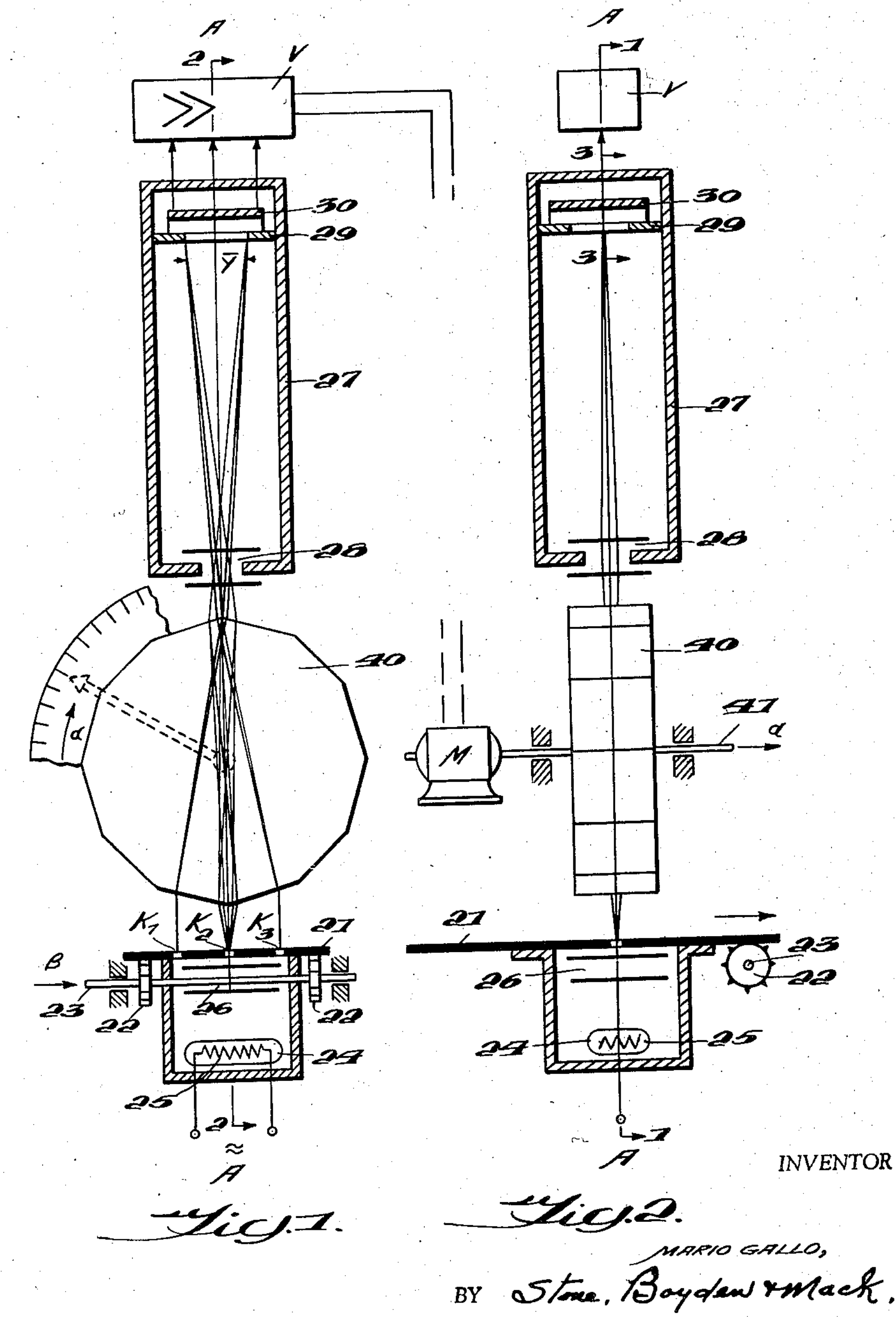
Fig. 1 is an elevational view, partly in section taken along line 1—1 of Fig. 2, and partly schematic, of the function generator of the invention.
Fig. 2 is an elevational view, partly in section taken along line 2—2 of Fig. 1, and partly schematic.
Figures 4, 5, 6:
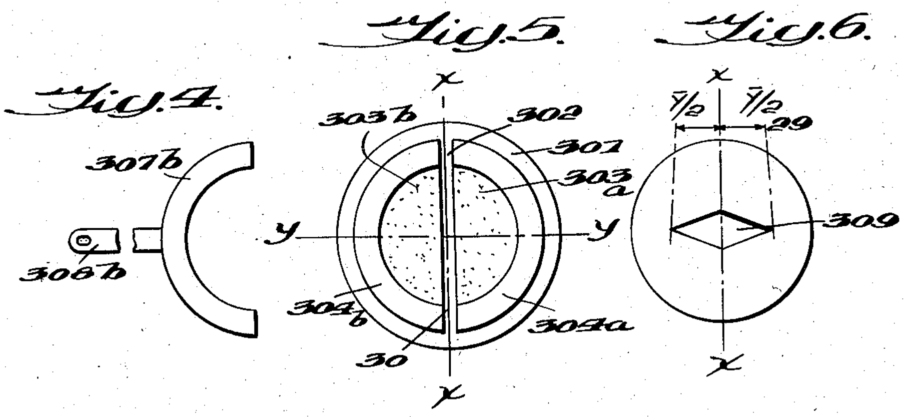
Fig. 4 is a plan view of one of the contact elements of the transducer.
Fig. 5 is a plan view of the backing plate, selenium layers, and lower contact segments of the transducer.
Fig. 6 is a plan view of the image screen diaphragm.
Figure 3:
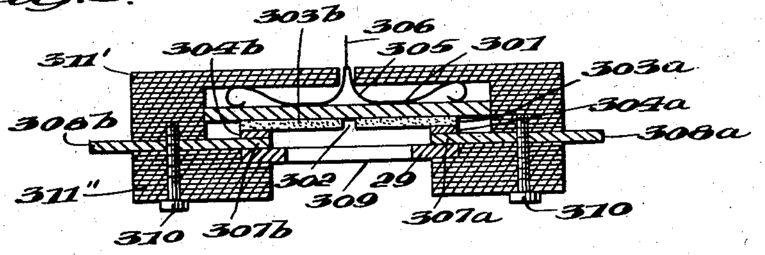
Fig. 3 is a sectional view taken along line 3—3 of Fig. 2 showing the light transducer and image screen diaphragm on an enlarged scale.

As in the prior application, the apparatus of the present application includes a function storage device, which is a film strip 21, having a function $y=f(x)$ recorded thereon in polydromic representation. As shown in Figs. 1 and 2, curve segments of the polydromic representation are formed by translucent segments on an otherwise opaque film. Apparatus for forming these segments on the film will be described hereinafter.

In Fig. 1, translucent segments $K_1$, $K_2$ and $K_3$ represent three segments of the function stored on the film strip 21. The film strip may have the usual perforations uniformly spaced along its opposite sides in such manner that the film can be moved in a longitudinal direction parallel to its sides and relative to the optical axis A—A of scanning means described hereinafter. The film-advancing means includes a pair of toothed wheels 22 cooperating with perforations in the sides of the film strip and mounted on a shaft 23. The shaft 23 is given motion in accordance with an input quantity $\beta$ which may be constant or variable.

The polydromic-recorded function $y=f(x)$ is recorded on the strip in such fashion that its abscissa axis is parallel to the sides of the strip and intersects the optical axis A—A of the scanning means. The ordinate values of the curve segments are then at right angles to the direction of film movement and are sensed by the scanning means.

The scanning means includes a source of light energy comprising a lamp 24 having a filament 25 supplied from a suitable source of voltage (not shown). The lamp may be mounted in a light-shielding container closed at its upper end by the film strip and having an optical condenser 26 mounted therein to direct light energy through the translucent segments of the film strip.

The scanning means also includes a substantially tubular support 27 mounted on the opposite side of film strip 21 from light source 24 and carrying therein a photographic objective 28 at its open mouth for focusing light energy from the source onto an image screen diaphragm 29. Diaphragm 29 has an opening therein which will be later more fully described and which permits light focused on the diaphragm by the objective 28 to pass therethrough onto a light-sensitive electrical transducer 30. The electrical output of transducer 30 is connected by appropriate conductors indicated schematically in Figs. 1 and 2 to a voltage amplifying and controlling device identified as V. The output of the amplifier V is supplied by appropriate conductors to a servo motor M which drives an optical diverter 40 forming a part of the scanning means, through a shaft 41 on which the diverter is mounted. The position of shaft 41 represents the output quantity $\alpha$ which is to be controlled by the input quantity $\beta$ (position of shaft 23) in accordance with the function $y=f(x)$ recorded on film strip 21. As indicated schematically in Fig. 1, the instantaneous position of the output shaft may be shown by an appropriate pointer cooperating with a scale.

Optical diverter 40 is a regular polygon plane prism of $2n$ sides, where $n$ is a whole integer. As shown, it is an octagonal glass prism through which light energy passes from the film storage strip 21 to the transducer 30. Of course, it could be a polygon mirror, as well as a refracting prism. The shaft 41 of the diverting prism 40 is mounted parallel to the abscissa axis of strip 21 and intersects at its center the optical axis A—A of the scanning system. Obviously, all light that reaches the transducer 30 from the film strip must pass through the diverting prism 40. Also obviously, the objective 28 focuses on the plane of the image screen diaphragm 29 light energy from light source 24 passing through the area of the film strip 21 immediately adjacent the optical axis A—A.

The novel light-sensitive electrical transducer of this invention will now be more fully described in conjunction with Figs. 3–6. In those figures, a differential photocell arrangement is procured by mounting on a metal conducting backing plate 301 a pair of segments 303a, 303b, of photovoltaic composition separated from one another by a small distance 302. The segments 303a and 303b are preferably substantially semicircular in form and the zone of separation 302 is parallel to the abscissa axis of the recording strip and intersects the optical axis A—A of the scanning means. In order to permit connection of any electrical voltage difference obtained across the segments 303a and 303b to amplifier V, the segments have a pair of arcuate contacting metal layers 304a and 304b vapor-deposited thereon. A resilient contact plate 305 is mounted above metal plate 301 and performs the double function of retaining the contact plate 301, the photovoltaic segments 303a and 303b, and the arcuate contact layers 304a and 304b in intimate contact. The contact plate 305 is formed with a connection 306 which in turn is connected to the input of amplifier V.

In order to connect the arcuate contact layers 304a and 304b to the amplifier, a pair of ring-shaped contact members 307a and 307b are provided. These members, like contact layers 304a and 304b, are arcuately shaped and bear directly against the undersides of the layers. Contact members 307a and 307b are connected to amplifier V by means of conductors 308a and 308b, respectively.

The image screen diaphragm 29 consists of a plate of circular plan and having an image screen opening 309 therein at the center thereof formed substantially as a diamond, or, otherwise described, of two triangles having a common baseline. The baseline of the triangles is parallel to and intersects the abscissa axis of the film strip and the triangles are arranged symmetrically of the abscissa axis with their apices spaced therefrom by distances of $\bar{y}/2$, where $\bar{y}$ is the distance between the spaced parallel curve segments of the polydromic representation, as will be more fully described hereinafter.

All of the associated elements of the photo-sensitive electrical transducer 30, and the image screen diaphragm 29, are held together in a pair of holder plates 311' and 311'' by screws 310.

Figure 7:
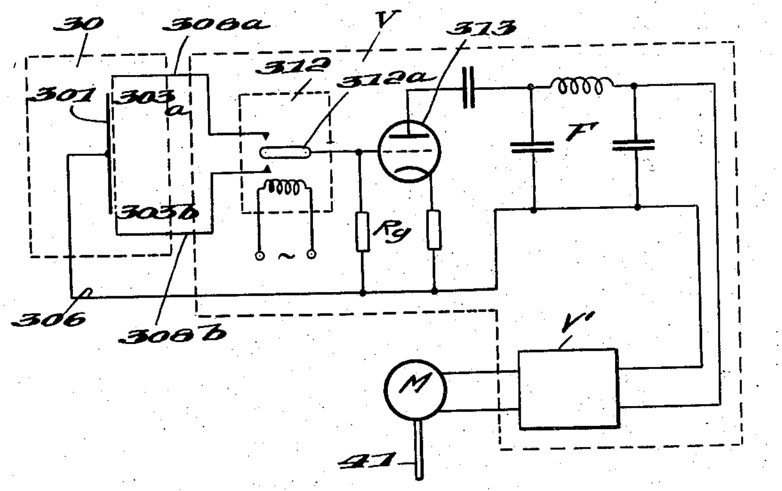
Fig. 7 is a schematic of an amplifier connected between the light transducer and the positioning motor.

As will be evident from the above description, whenever light energy strikes either one of photovoltaic segments 303a and 303b, a D.-C. voltage is developed between the corresponding wire 308a or 308b and wire 306. This voltage is transmitted to the amplifier V, now to be described in conjunction with Fig. 7. The wires or conductors 308a and 308b of the transducer are connected to the fixed contacts of an electrical vibrator 312 having a coil supplied from the usual A.-C. source (not shown) and a movable contact 312a which vibrates between the fixed contacts at a speed determined by the frequency of the A.-C. source. Contact 312a is connected through a grid leak resistance $R_g$ to wire or conductor 306, so that a voltage is developed across the resistance whenever light energy strikes either one or both of photovoltaic segments 303a and 303b, the voltage having a polarity determined by which of the segments receives the larger amount of light energy, an amplitude depending on the difference between the amounts of light energy received by the two segments, and having a pulsating component of the frequency of the vibrator. The voltage developed across resistance $R_g$ is amplified in vacuum tube 313 and connected across a suitable filter F which develops at its output an A.-C. voltage. The A.-C. output of the filter is of the vibrator frequency and has a magnitude determined by the difference between the magnitudes of the voltages developed across the photovoltaic segments and has a phase determined by which of the two segments receives more light energy. The output of filter F is supplied to a suitable linear voltage amplifier V' which in turn feeds the servo motor M. Motor M and the amplifying system are so designed that the speed of the motor shaft 41 is approximately proportional to the amplitude of the controlling voltage fed into the motor, and its direction of rotation depends on the phase of the voltage supplied to the motor. The circuits of the motor may be similar to those disclosed in the co-pending application above identified.

Figures 10, 11:
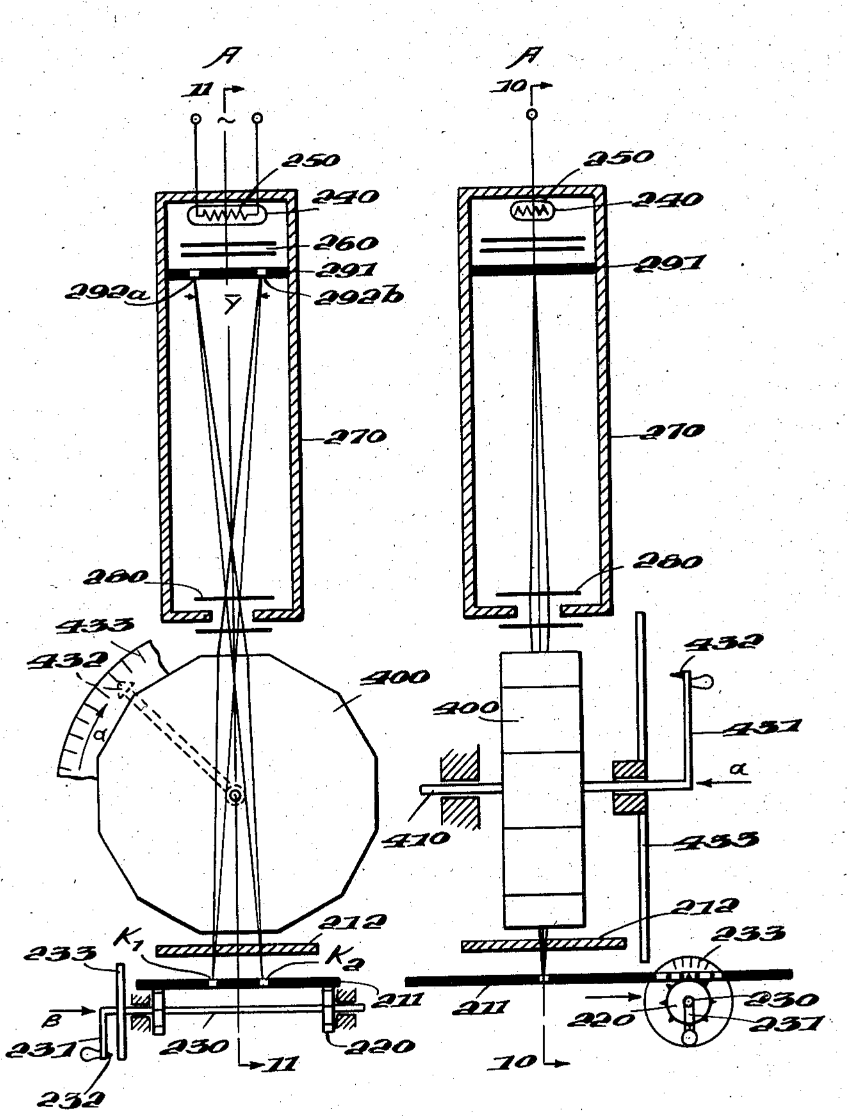
Fig. 10 is an elevational view, partly in section taken along line 10—10 of Fig. 11, and partly schematic, of a recording apparatus constructed in accordance with the invention; and, Fig. 11 is an elevational view, partly in section taken along line 11—11 of Fig. 10, and also partly schematic.

Before describing the operation of the function generating apparatus of Figs. 1–7, an apparatus for recording the function $y=f(x)$ in polydromic representation upon a film storage device, such as the film strip 21 of the earlier figures will be described. Figs. 10 and 11, show such an apparatus, which corresponds in optical inverse form exactly with the reproduction device shown in Figs. 1–7. In the apparatus of Figs. 10 and 11, the film strip 211 is moved along its length by cooperation between perforations in its opposite sides and a pair of toothed transport wheels 220 mounted on a shaft 230. The movement of shaft 230 represents the input function $\beta$ which is to be used with the apparatus, and is read from a scale 233 with which a pointer 232 mounted on the crank arm 231 of shaft 230 cooperates. Since movement of shaft 230 by crank arm 231 causes lengthwise movement of film strip 211 in the abscissa direction, the abscissa displacement can also be read from scale 233. The prismatic optical diverter 400 of Figs. 10 and 11 has substantially identical optical characteristics to those of the diverting prism 40 of Figs. 1 and 2. In this case, however, the optical diverter directs light energy received from above through a cell and onto the film strip to expose sections of the strip, which, when developed, represent segments of the function $y=f(x)$. The prism 400 is carried by shaft 410 having a crank arm 431 with a pointer pin 432 cooperating with a scale 433. The setting of the shaft 410 represents the output quantity $\alpha$ which it is desired to effect with the curve segments recorded on the film strip.

The apparatus for providing and controlling the path of light energy between its source and the optical diverting prism 400 includes a tubular support 270 carrying a light energy source 240 with a filament 250 supplied with the usual A.C. voltage. Light energy from source 240 is condensed by optical condenser 260 and transmitted through a pair of openings 292*a*, 292*b*. The openings are spaced distance $\bar{y}$ which corresponds to the distance between the curve segments recorded on the film strip. Light energy passing through the holes in the diaphragm 291 are concentrated by an objective 280 and transmitted into the optical diverting prism 400.

In operation of the apparatus of Figs. 10 and 11, the film strip is exposed to light energy at points determined by the position of the optical diverter 400. When the diverting prism is in the position shown in Fig. 10, light rays from the two holes in diaphragm 291 cross in the prism and expose areas of the film strip shown at $K_1^*$ and $K_2^*$. The spacing between the two exposed points on the film strip is preferably the same distance as the distance between the holes 292*a* and 292*b* in the diaphragm 291. Actually, of course, this is not absolutely necessary, the only thing critical about the spacing of the curve segments represented by $K_1^*$ and $K_2^*$ in Fig. 10 being that, when the exposed film strip is used in the apparatus of Figs. 1 and 2, both segments, such as $K_1$ and $K_2$ in the latter figures, should be focused on the screen diaphragm 29 in such manner that their images in the plane of this diaphragm are spaced apart a distance $\bar{y}$, that is, the identical distance to the maximum extent of the opening in diaphragm 29.

When shaft 410 of Figs. 10 and 11 is turned to a position such that the common edge of two adjacent planes on the surface of prism 400 intersects optical axis A—A of the scanning system, the light rays split, as shown in Figs. 1 and 2 inversely, to form three points of exposure of the film. This only takes place whenever the edge of intersection of any two surface planes of the prism crosses the optical axis. In such case, three points, namely $K_1$, $K_2$ and $K_3$, of exposure of the film are formed on the film strip, as shown in Fig. 1. The reason for this arrangement will be more fully described in conjunction with the further explanation of the operation of the apparatus of Figs. 1–7.

It is obvious that with the apparatus of Figs. 10 and 11 for any angular value $\beta$ of the position of input shaft 230, a position of output shaft 410, $\alpha$, can be set according to the desired function $\alpha=f(\beta)$ between the two values. The exposed areas of the film strip will then cause a function $y=f(x)$ to be recorded on the strip in polydromic representation, which strip may then later be used to cause duplication of the function between output and input values in accordance with the function recorded on the strip. In order that light energy may strike the film only when the position of the output shaft 410 is that which is desired, a slit diaphragm

212 may be provided, the diaphragm being capable of opening under the control of the recording operator only when the position $\alpha$ of the output shaft corresponds to the value of $\alpha$ determined by the function $\alpha=f(\beta)$.

It will be obvious that the ordinate values of the diaphragm images, or points on the film strip $K_1^*$ and $K_2^*$, do not change linearly with the changes in angular position of the prism, so that the function $y=f(x)$ recorded on the film strip is distorted relative to the prescribed function $\alpha=f(\beta)$. However, this distortion is cancelled out during the reproduction of the function $y=f(x)$, as recorded in this manner, by means of use of the apparatus of Figs. 1–7, having an optical diverting prism 40 with identical optical characteristics to that used in the recording step, namely 400.

In exposing and developing the film strip obtained with the apparatus of Figs. 10 and 11, the operator should be careful that no half tone values of the exposed segments of the film result, but rather that the curved segments formed on the film remain completely transparent even when a smaller amount of light energy impinges on the film, for instance, during transition such as caused by intersection of the bounding edge between two surface planes of the prism with the optical axis.

Figures 8, 9:
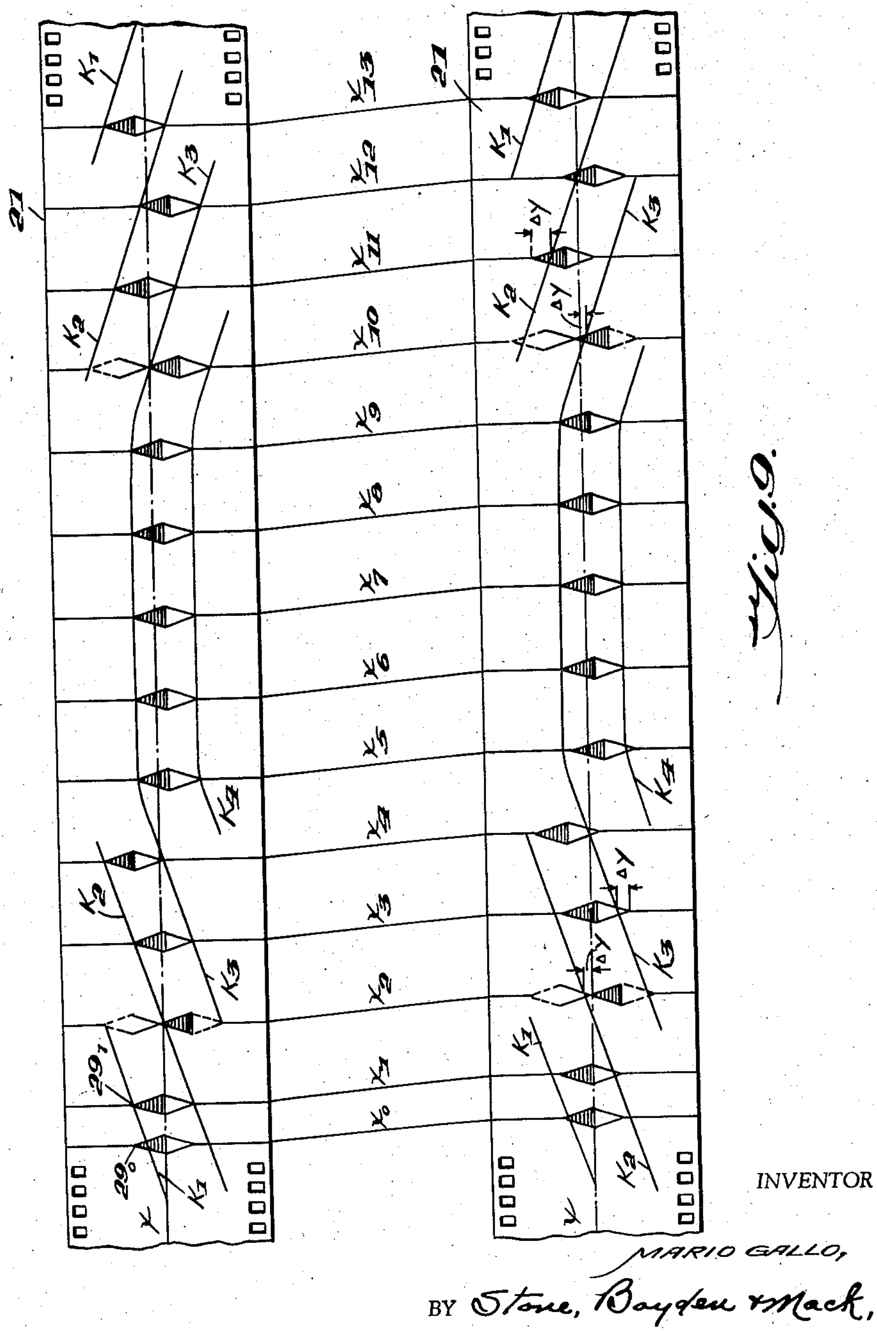
Fig. 8 is a diagrammatic view of a film strip and an image screen diaphragm showing the interaction of these elements in a quasi-stationary or slow-moving condition.
Fig. 9 is a view corresponding to Fig. 8 showing the interaction of these elements in a dynamic or fast-moving condition.

Referring now to Figs. 8 and 9, the operation of the apparatus of Figs. 1–7 will be more fully discussed. It will be evident from those figures, that is, Figs. 8 and 9, that the distance between the ordinate extremities of the opening in the image screen diaphragm 29 is identical with the corresponding distance between adjacent parallel curve segments recorded on the film strip.

Comparison of Figs. 8 and 9 of this application with Figs. 11 and 12 of the aforementioned co-pending application will make evident one important distinction in the apparatus of the present invention. Whereas the prior invention depended upon use of a pair of separate, discrete image screen diaphragm openings, arranged above only one curve segment at any one instant, the present invention uses a single opening formed of two common base triangles and arranged optically above a pair of curve segments spaced apart, at least in their projection upon the diaphragm, by a distance equal to the distance between the maximum ordinate values of the opening. This enables the apparatus to conform with more exactitude to the output shaft position directed by the function recorded on the strip.

Fig. 8 is a projection of the image screen diaphragm opening on the film strip for a quasi-static or slow-moving operation of the apparatus of Figs. 1–7. Though actually the film strip moves relative to the image screen diaphragm opening, the opening is shown as moving across the strip for convenience of illustration. In the quasi-static operation, the output shaft is able to follow the position directed by the recorded function and the input shaft movement with practically perfect speed and exactitude. In the position $x_0$ of the film strip, representing initial energization of the apparatus, the position $29_0$ of the image screen diaphragm opening is shown as slightly in error from that directed by the apparatus. The shaded portion of the image screen diaphragm opening then directs light energy to the corresponding photovoltaic segment of the transducer, thus causing a voltage to be developed across the transducer and supplied through the amplifier to motor 40. The motor 40 then rotates to correct the position of output shaft 41, so that when the film strip has moved to the position $x_1$, the position $29_1$ of the diaphragm opening is shown as correct. In movement of position from $x_1$ to $x_2$ of the film strip, the diaphragm opening moves exactly between the two segments $K_1$ and $K_2$, so that there is no difference in voltage developed across the photovoltaic segments 303*a* and *b*, and no correcting voltage is supplied to the motor. At position $x_2$, corresponding to intersection of the common edge of a pair of planes of the surface of the optical diverter with the optical axis of the scanner, the diaphragm opening is shown as moving downwardly to be between curve segments $K_2$ and $K_3$. The position of the output shaft 41 then changes linearly in a positive direction in the area between film strip positions $x_2$ and $x_4$, when a second transition occurs and the opening is then between segments $K_3$ and $K_4$. If the curve segments recorded on the film strip had infinitesimal extent or width, the diaphragm opening would not allow any light energy to impinge on the photovoltaic segments of the transducer. However, since the curve segments do have appreciable width, light energy reaches the segments even when the output shaft is in the correct position directed by the curve segments, corresponding to the position from $x_1$ through $x_{13}$ of Fig. 8. However, the light energy impinging on each of photovoltaic segments 303*a* and 303*b* is equal, so that no correcting voltage is directed to the motor.

In the area between positions $x_5$ and $x_9$ of the film strip, the function $y=f(x)$ on the strip has a constant ordinate value, so that the position of the optical diverter remains stationary in this interval. Between $x_9$ and $x_{10}$, the function decreases in value, so that the output shaft and the optical diverter move accordingly. At position $x_{10}$ there is once more a transition between pairs of adjacent curve segments back to segments $K_2$ and $K_3$ on the film strip. A further transition takes place at position $x_{13}$.

The schematic showing of Fig. 8 has been predicated upon a quasi-stationary mode of operation of the apparatus based on the assumption that the film strip is moved along its length with such a low speed that the prism 40 can follow exactly the position directed by the curve segments in the area of such speed. However, under practical conditions with a fairly large speed of the film strip, or with substantial variations therein, the ordinate values of the curve segments change so rapidly that, in accordance with the steepness $$\frac{dy}{dx}$$

of the function $y=f(x)$, the prism must be turned with a correspondingly high rotational speed $$\frac{d\alpha}{dt}$$

in order that the output shaft can follow the curve. In order for this to obtain, a controlling voltage of correspondingly high amplitude for the servo motor must exist, and this latter requires a rather large displacement error $\Delta y$ between the position of the output shaft and the theoretical position of the shaft directed by the curve segment. Operation of the apparatus in a dynamic condition of operation is shown in Fig. 9, this figure showing errors in the positions of the output shaft sufficient to obtain these displacements $\Delta y$ to provide the necessary correcting voltages for the position of the motor.

In position $x_0$ of the film strip, the position of the output shaft 41 is in error to the extent indicated in Fig. 9, so that the shaded portion of the diaphragm opening transmits light energy to the corresponding photovoltaic segment. A voltage tending to correct the inaccuracy in the position of the output shaft is thereby obtained, but between the positions $x_0$ and $x_1$ of the film strip, because of the relatively high speed of motion of the strip, the motor has not as yet had time to correct the position of prism 40. Between positions $x_1$ and $x_2$, the motor has moved the shaft in the direction directed by the curve segments, but, as will be seen in conjunction with position $x_2$ there is still an error in the position of the shaft represented by the value $\Delta y$ in the displacement of the diaphragm opening with respect to the curve segments.

Since, in the interval between $x_0$ and $x_4$, the ordinate values of the curve segments increase continuously with a constant slope, the error $\Delta y$ sufficient to drive the prism correctly remains constant and the output shaft follows the position directed by the curve segments exactly but with a delay corresponding to $\Delta y$. In other words, in this area, the prism always rotates with the same rotational speed $$\frac{d\alpha}{dt}$$

In the area between abscissa values $x_5$ and $x_9$, the ordinate values of the function are constant, so that the prism slows down, until it reaches the proper position at $x_6$ and stops, remaining stationary through the position $x_9$. Following abscissa value $x_9$, the ordinate values of the curve segments decrease, so that the prism begins to rotate, but in the opposite direction, there again being an error in the position of the prism, determined by the displacement $\Delta y$.

It will be noted from Fig. 9 that several transitions between faces of the optical diverging prism exposed to light energy occur, namely those at $x_2$, $x_{10}$, etc. Comparison with Fig. 8, however, will show, that unlike the condition in Fig. 8 where transition always occurs when one of the segments crosses the abscissa axis of the film strip, transition occurs in accordance with Fig. 9 when the curve segments have a displacement in the ordinate direction of $\Delta y$ from the abscissa axis. This interval is fixed during recording in such manner that the voltage supplied to the correcting motor 40 corresponding to displacement value $\Delta y$ is sufficient to insure correct position of the motor with respect to the positions directed by the recorded function. This displacement value $\Delta y$ at which transition occurs has a magnitude determined by the magnitude of the change of the ordinate value with respect to time, $$\frac{dy}{dt}$$

that is, upon the product fraction $$\frac{dy}{dx}\cdot\frac{dx}{dt}$$

The sign of this displacement in the ordinate direction at which transition occurs is determined by the sign of the product just mentioned. As an illustration, transition occurs at position $x_2$ when the ordinate value of the curve segment $K_2$ has reached the magnitude there shown, with $\Delta y$ being in the positive direction, since the slope of the curve segment is positive. In contrast, at transitional point $x_{10}$, though $\Delta y$ is substantially of the same value, it is negative, or in the opposite direction from that at $K_2$, since the slope $$\frac{dy}{dt}$$

in this area is negative.

It will be obvious that I have described apparatus for producing an output quantity, such as the rotational angle $\alpha$ of a prism shaft, which varies in a predetermined functional dependency upon an input quantity $\beta$, such as the angular position of a film-advancing shaft, dependent upon a function $y=f(x)$ recorded on a film strip. The accuracy of dependency of the output quantity upon the function recorded on the film strip can be substantially as great as desired, providing that the same type of device as used in recording is used in function generating. In other words, the function should be recorded on the film strip with an apparatus of the type shown in Figs. 10 and 11, when apparatus of the type shown in Figs. 1–7 is to be used for function generating.

It will be obvious that many minor changes could be made in the apparatus specifically described above, without departure from the scope of the present invention. Accordingly, the invention is not to be considered limited to the preferred embodiment described, but rather only by the scope of the appended claims.

I claim:

1. Apparatus for generating an output quantity having a predetermined functional dependence upon an input quantity, comprising a recording film strip having a function $y=f(x)$ recorded thereon in polydromic representation with curve segments differing optically from the surrounding area of the strip, said curve segments including, in each portion of the strip, a pair of identical spaced parallel segments, means for displacing the film strip parallel to its abscissa axis in accordance with the input quantity, means for scanning the film strip comprising a light source, a photosensitive electrical transducer on the opposite side of the film from the light source, an optical diverter positioned between the film and transducer and whose position represents the output quantity, an image screen diaphragm between the diverter and the transducer having an opening of the shape of a pair of triangles with common base line parallel to the abscissa axis of the film strip, said diaphragm being positioned between the diverter and the transducer and said opening being of such size with respect to the spacing of the parallel curve segments that light from both of the parallel curve segments reaches the transducer when the diverter is in proper position, and means controlled by the output of the transducer to move the optical diverter toward the proper position.

2. The apparatus of claim 1 in which said transducer comprises a pair of separated segments of photovoltaic composition, contact means connected to both of said last-named segments, a pair of contact means each connected to a different one of said last-named segments, all of said contact means being connected to said means controlled by the output of the transducer.

3. The apparatus of claim 1 in which the distance of the spacing between said parallel curve segments in the ordinate direction and the distance of the maximum extent of said opening in the image screen diaphragm in the ordinate direction are equal.

4. The apparatus of claim 2 in which each of said pair of segments is substantially of semi-circular form and these are arranged with their linear edges parallel and spaced apart a small distance, said pair of contact means comprises a pair of arcuate metal layers, and means for clamping all of said contact means, said metal layers, and said segments of photovoltaic composition together.

5. An apparatus for generating an output quantity $\alpha$ having a predetermined functional dependence upon an input quantity $\beta$, $\alpha=f(\beta)$, determined by a function $y=f(x)$, comprising a recording film strip having said function $y=f(x)$ recorded thereon in polydromic representation and having the abscissa axis of said representation parallel to a side of said strip, the curve segments of said polydromic representation being translucent against an opaque background, means for displacing said strip in the direction of said one side thereof in dependence upon said input quantity $\beta$, a source of light energy on one side of said strip, a rotatable optical diverter on the opposite side of said strip for controlling the path of light energy from said source passing through the strip, the angular position of the diverter representing said output quantity $\alpha$, a pair of photovoltaic segments mounted on the opposite side of said diverter from the strip in the path of light energy from the diverter, said segments being spaced apart slightly in the ordinate direction of said strip, electric contact means connected to both said last-mentioned segments, a pair of electric contact means one connected to each of said last-mentioned segments, a motor controlling the angular position of said diverter, means connected to all of said contact means for developing an A.-C. voltage of phase dependent upon which of said last-mentioned segments receives the greater amount of light energy and of magnitude dependent upon the magnitude of the difference in light energy received, means supplying the output of said last-mentioned means to said motor to control the rotation thereof in direction and speed dependent upon the phase and magnitude of said A.-C. voltage, and an image screen diaphragm mounted between said optical diverter and said photovoltaic segments having an opening for passage of light energy substantially of diamond shape and symmetrical with respect to the abscissa axis of the strip, the polydromic representation on said strip including a pair of identical curve segments parallel to each other in each section of the strip, said parallel segments being so spaced apart in the ordinate direction and the opening in the image screen diaphragm being of such extent in the ordinate direction that said opening fits exactly between images of said parallel curve segments in the plane of the image screen diaphragm when said optical diverter is in the position directed by the function recorded on the strip.

6. Apparatus as defined in claim 5 in which said optical diverter is a regular polygon prism of $2n$ sides, where $n$ is a whole integer, and mounted on a shaft extending parallel to the abscissa axis of the polydromic representation.

References Cited in the file of this patent

UNITED STATES PATENTS

| | | |
|---|---|---|
| 2,160,603 | Sagebeer | May 30, 1939 |
| 2,510,121 | Lehmann et al. | June 6, 1950 |
| 2,545,331 | Works | Mar. 13, 1951 |
| 2,622,147 | Condliffe et al. | Dec. 16, 1952 |
| 2,628,539 | De Neergaard | Feb. 17, 1953 |
| 2,640,866 | Powell | June 2, 1953 |
| 2,769,922 | Peery | Nov. 6, 1956 |